US006216084B1

(12) United States Patent
Uematsu et al.

(10) Patent No.: US 6,216,084 B1

(45) Date of Patent: Apr. 10, 2001

(54) MEMORY CHECK APPARATUS AND METHOD FOR CHECKING DATA UPON RETRIEVAL FROM MEMORY

(75) Inventors: Yoshitaka Uematsu, Anjo; Hajime Nomura, Okazaki; Akihito Iwai, Chiryu, all of (JP)

(73) Assignee: Denso Corporation, Kariya (JP)

(*) Notice: Subject to any disclaimer, the term of this patent is extended or adjusted under 35 U.S.C. 154(b) by 0 days.

(21) Appl. No.: 09/363,414

(22) Filed: Jul. 29, 1999

(30) Foreign Application Priority Data

Oct. 8, 1998 (JP) ..................... 10-286930

(51) Int. Cl.[7] ..................... G06F 11/07

(52) U.S. Cl. ..................... 701/114; 701/115

(58) Field of Search ..................... 701/101, 114, 701/115

(56) References Cited

U.S. PATENT DOCUMENTS 4,587,655 * 5/1986 Hirao et al. .................. 701/114
4,862,371 * 8/1989 Maekawa .................. 701/114
4,896,276 * 1/1990 Saglimbeni et al. .................. 701/114
4,943,924 * 7/1990 Kanegae et al. .................. 701/114
5,047,944 * 9/1991 Ishikawa et al. .................. 701/114
5,119,381 * 6/1992 Yamamoto .................. 701/114
5,668,726 * 9/1997 Kondo et al. .................. 701/114

FOREIGN PATENT DOCUMENTS 6-250940 9/1994 (JP) .
10-83355 3/1998 (JP) .

* cited by examiner

*Primary Examiner*—Willis R. Wolfe

(74) *Attorney, Agent, or Firm*—Nixon & Vanderhye

(57) ABSTRACT

In a control apparatus and method for vehicles, control data such as engine air-fuel ratio correction values are learned and stored in a backup RAM to be used in engine control. Before the data are actually used in the engine control, not all the stored data are checked but only the data read out from the backup RAM to be used for control calculation are checked. Thus, all the memory data necessary are ensured to be checked in a short period of time, and improper control operation resulting from erroneous data can be obviated. Further, abnormality checking of all the stored data is executed at a specified timing separately. When the abnormality is found in any of the data, all the data in the backup RAM are initialized.

10 Claims, 5 Drawing Sheets

$$TAU = TAUB + FMW + ADJ$$

$$TAUB = Tp \times IDL \times AF$$

MEMORY CHECK APPARATUS AND METHOD FOR CHECKING DATA UPON RETRIEVAL FROM MEMORY

CROSS REFERENCE TO RELATED APPLICATION

This application relates to and incorporates herein by reference Japanese Patent Application No. 10-286930 filed on Oct. 8, 1998.

BACKGROUND OF THE INVENTION

1. Field of the Invention

The present invention relates to a memory check apparatus and method for checking abnormality of data such as leaned control values and diagnosis results stored in a memory.

2. Background of the Invention

An electronic control apparatus for vehicle engines has a backup RAM, which is continuously supplied with electric power even after an ignition switch is turned off so that various data such as engine diagnosis results and learned control values are kept stored to be used later in engine control and diagnosis.

Those data stored in the backup RAM may be broken or changed due to external electrical noises, etc. It is therefore proposed to check periodically the backup RAM and initialize the memory upon detection of abnormality of the stored data.

In one proposal, all the memory data are checked every time the ignition switch is turned on. However, this method cannot check abnormal changes of the data, which may occur after the ignition switch is turned on and the control apparatus is in engine control operation, resulting in erroneous calculation of the control quantity.

In another proposal, the memory data are checked at every specified time interval after the ignition switch is turned on (JP-A-6-250940), or within an idle period in which no calculation program is executed (JP-A-10-83355). In this method also, the control quantity may be calculated erroneously due to memory data abnormality occurring between timings of successive memory checking.

SUMMARY OF THE INVENTION

It is therefore an object of the present invention to provide a memory check apparatus and method, which obviates the possibility of calculation of erroneous control data due to changes of memory data.

According to the present invention, not all memory data are checked but only data read out from a memory to be used for control calculation are checked, before the data are actually used. Thus, all the memory data necessary are ensured to be checked in a short period of time, and improper control operation resulting from erroneous data can be obviated.

BRIEF DESCRIPTION OF THE DRAWINGS

The above and other objects, features and advantages of the present invention will become more apparent from the following detailed description made with reference to the accompanying drawings. In the drawings.

DETAILED DESCRIPTION OF THE PREFERRED EMBODIMENT

The present invention will be described in detail with reference to an embodiment, which is directed to an engine fuel injection control system. This fuel injection control system has an air-fuel ratio learning control function.

Figure 1:
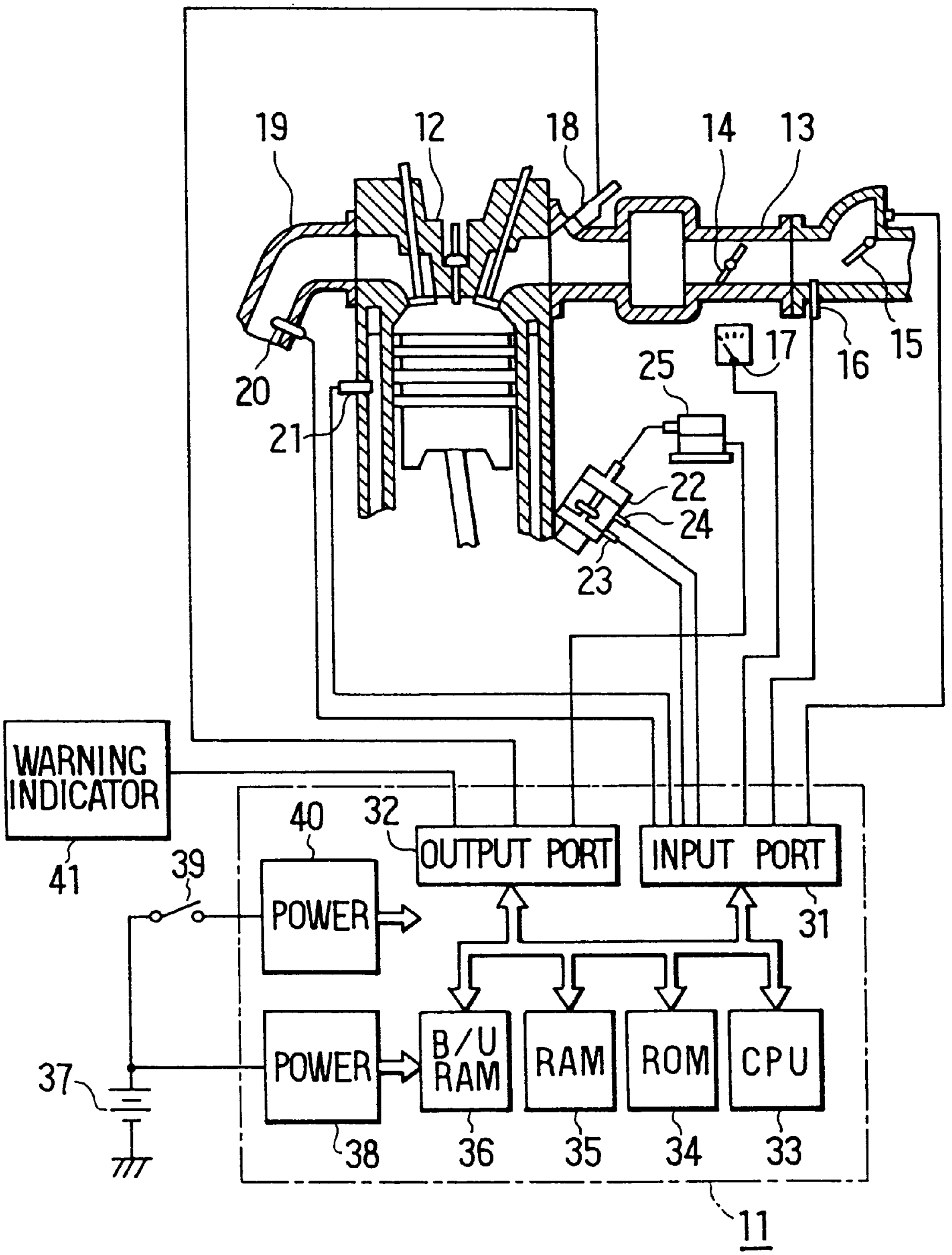
FIG. 1 is a schematic view showing an engine control system having a memory check function according to an embodiment of the present invention.

Referring to FIG. 1, an engine fuel injection control system has an electronic control unit (ECU) 11 which controls an internal combustion engine 12. The engine 12 has an intake system including an intake pipe 13 and a throttle valve 14 disposed in the intake pipe 13 and linked with an accelerator (not shown) to control the amount of air drawn into a cylinder.

In the intake system, an air flow meter 15, an intake air temperature sensor 16 and a throttle position sensor 17 are provided to detect the air flow amount, the intake air temperature and the throttle opening position, respectively. Further, fuel injectors 18 are mounted on the intake pipe 13 to inject pressure-regulated fuel into the engine 12 for a time period or duration calculated by the ECU 11.

The engine 12 also has an exhaust system including an exhaust pipe 19. An air-fuel ratio sensor 20 is mounted on the exhaust pipe 19 to detect the air-fuel ratio of air-fuel mixture supplied to the engine 12, which is represented by the oxygen concentration in the exhaust gas.

The control system has various sensors such as an engine coolant temperature sensor 21, a rotation position sensor 23 and a reference position sensor 24. The coolant temperature sensor 21 detects the water coolant temperature. The rotation position sensor 23 is provided in an ignition distributor 23 driven by the engine 12 and detects a predetermined angular rotation (30° CA) of an engine crankshaft (not shown). The reference position sensor 24 is also provided in the ignition distributor 22 and detects a reference rotation position of the engine 12 in two rotations of the crankshaft. An igniter 25 is connected between ECU 11 and the distributor 22.

The ECU 11 has an input port 31 and an output port 32. Detection signals of the air flow meter 15, the air temperature sensor 16, the throttle position sensor 17, the air-fuel ratio sensor 20, the coolant temperature sensor 21, the rotation position sensor 23 and the reference position sensor 24 are applied to the input port 31.

The ECU 11 determines the operation conditions of the engine 12 in response to the detection signals and calculates the fuel injection duration and the ignition timing in correspondence with the determined operating conditions.

The ECU 11 includes a central processing unit (CPU) 33 for the above fuel injection and ignition control operations. A control program defining operation sequence of the CPU 33 and fixed data to be used in the calculations of the CPU 33 are stored in a read-only memory (ROM) 34, and temporary data to be used in the calculations of the CPU 33 are stored in a random access memory (RAM 35). Various data such as learned control data are stored in a backup RAM 36.

The control data calculated by the CPU 33 are applied to the fuel injectors 18 and the igniter 25 through the output port 32. A warning indicator light 41 is connected to the ECU 11 to indicate occurrence of abnormality in the engine control system, for instance, abnormality in the data stored in the backup RAM 36.

The backup RAM 36 is continuously supplied with the electric power of a storage battery 37 through a power supply circuit 38, while other circuits are supplied with the electric power of the storage battery 37 through a power supply circuit 40 only when an ignition switch 39 is turned on, that is, only when the engine 12 is in operation. Thus, the backup RAM 36 is enabled to keep storing its data irrespective of the turning on and off of the ignition switch 39, that is, even when the ignition switch 39 is turned off and the engine 12 is at rest.

Figures 2, 4:
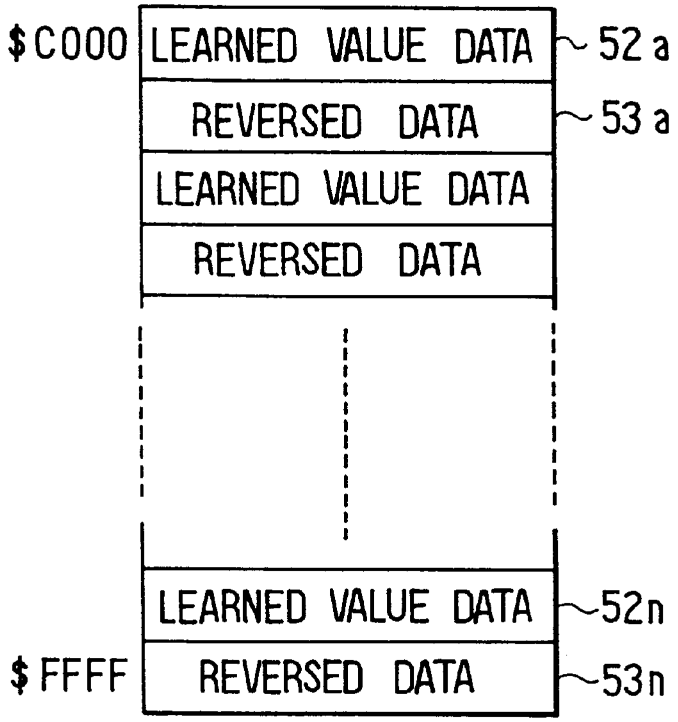
FIG. 2 is a schematic diagram showing an arrangement of data in a RAM used in the embodiment.
FIG. 4 is an explanatory diagram showing a calculation of fuel injection duration in the embodiment.

In the backup RAM 36, the data are stored in the form shown in FIG. 2. That is, in the case of learned value data such as an air-fuel ratio correction learned value data, which is updated from time to time during the execution of the air-fuel ratio feedback control and used in the air-fuel ratio control in the known manner, each of the data 52*a* to 52*n* is paired with its reversed data 53*a* and 53*n*. The reversed data (e.g., 53*a*) is a series of reversal of each bit of the data (e.g., 52*a*) and is for use in checking abnormality of the data (e.g., 52*a*). This pair is provided for each control item and arranged in order.

Figure 3:
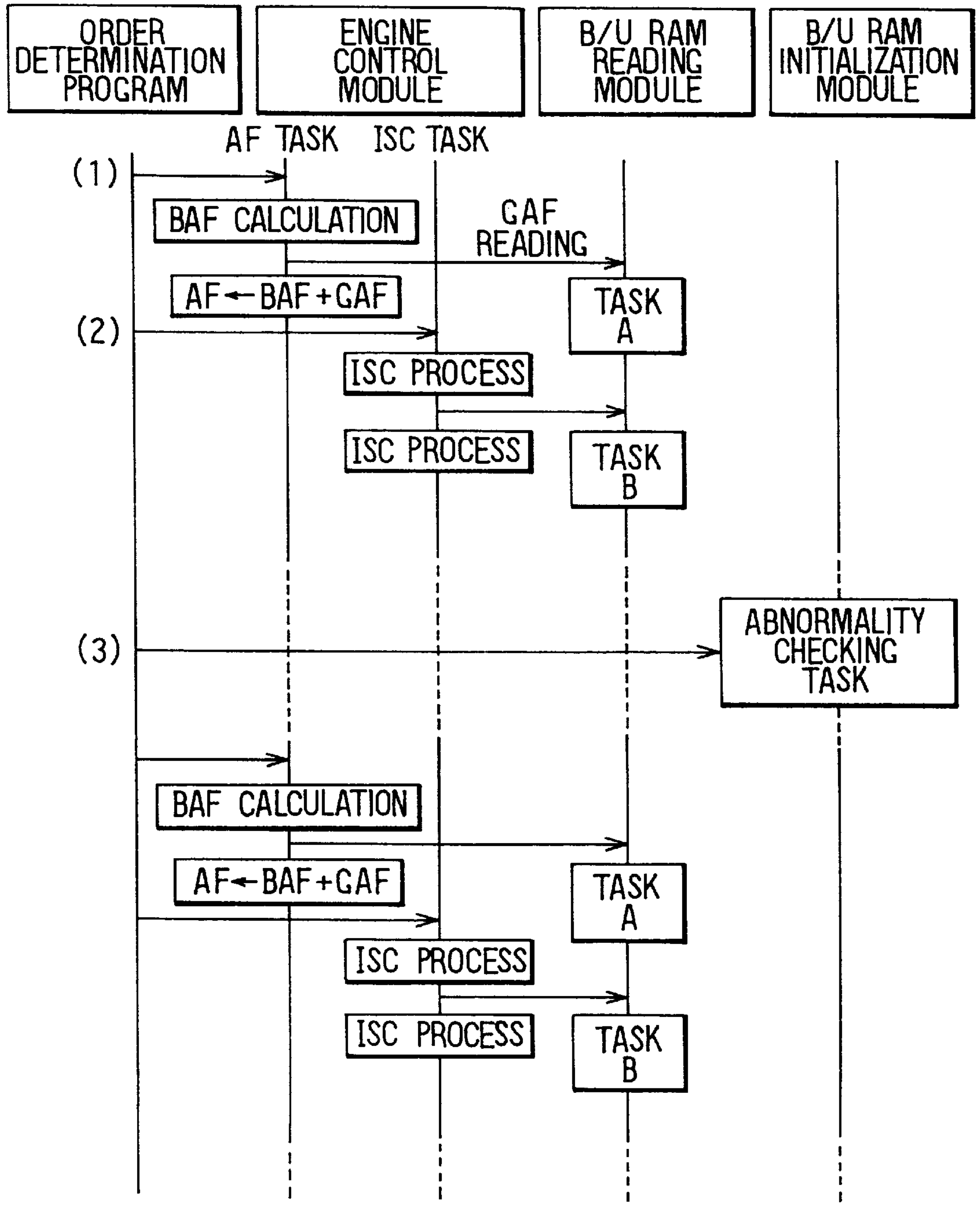
FIG. 3 is a message sequence diagram showing a processing of an engine control program used in the embodiment.

The CPU 33 operates to control the engine 12 while executing a processing of the engine control program as shown in the message sequence diagram of FIG. 3. In this figure, only an air-fuel ratio correction value calculation task (AF task) for calculating the air-fuel ratio correction value to be used in the calculation of the fuel injection quantity or duration and an idle speed control quantity calculation task (ISC task) are shown for brevity, although the CPU 33 executes various complicated calculation tasks for the engine control.

As shown by (1) and (2) in FIG. 3, an execution order determination program, which is for determining the order of tasks to be instructed to the CPU 33, measures the timing of execution of each task and initiates the AF task, ISC task and the like within an engine control module at predetermined timings (e.g., at every 8 ms interval). The engine control module corresponds to a function unit which results from division of the program by function.

The AF task and ISC task execute respective calculation processing when called or requested from the execution order determination program. The AF task and the ISC task refer to or read out data such as GAF stored in the backup RAM 36 in the respective processing. Those operations are attained by calling read-out processing (task A and task B) of the backup RAM 36, respectively. The calling operations between the tasks and read-out processing are indicated by arrows (→) in the message sequence diagram of FIG. 3. In this embodiment, the checking of data stored in the backup RAM 36 is executed in the read-out module of the backup RAM 36, that is, in the processing of task A and task B in FIG. 3.

Further, in this embodiment, an initialization module for initializing the backup RAM 36 is provided, so that an abnormality checking task is executed at a predetermined timing (e.g., at every 65 ms interval) as shown by (3) in FIG. 3. The abnormality checking task refers to the check results of the task A and task B, and initializes all data stored in the storage areas of the backup RAM 36 when it is confirmed that an abnormality has occurred in any one of the tasks.

Figure 5:
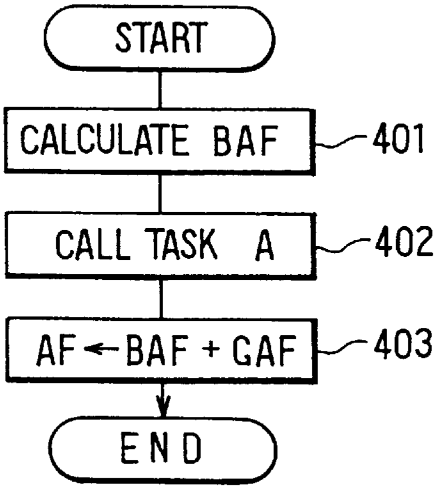
FIG. 5 is a flow diagram showing a processing of an AF task in the embodiment.

The CPU 31 calculates the fuel injection quantity in terms of the fuel injection duration TAU as shown in FIG. 5. Specifically, in the calculation of the fuel injection duration TAU, a basic fuel injection quantity Tp is calculated from the intake air quantity detected by the air flow meter 15 and the engine rotation speed detected by the rotation position sensor 23. The basic quantity Tp is corrected by an engine stall prevention correction value IDL and the air-fuel ratio correction value AF. The correction value IDL is calculated based on the water coolant temperature detected by the coolant temperature sensor 21 and the like, while the correction value AF is calculated based on the air-fuel ratio detected by the air-fuel ratio sensor 20 and the like. The resultant value TAUB is further corrected with an intake port wall-sticking fuel correction value FMW and an external adjustment correction value ADJ.

Figure 6:
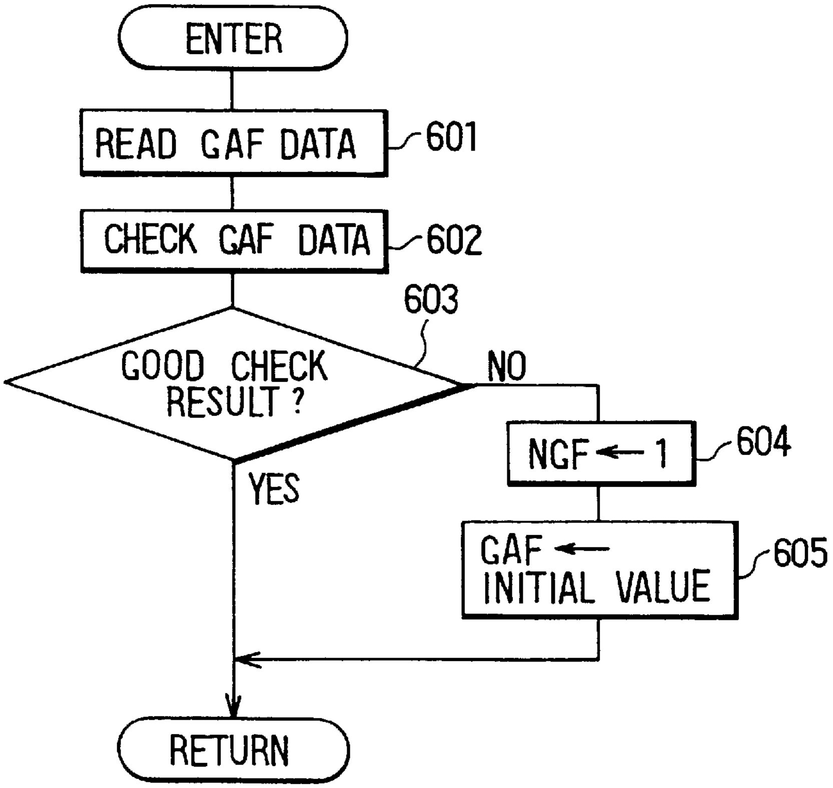
FIG. 6 is a flow diagram showing a processing of a task A in the embodiment.

In calculating the fuel injection duration TAU, more specifically in calculating the air-fuel ratio correction value AF by using the learned value stored in the backup RAM 36, the CPU 33 executes the AF task as shown in FIGS. 5 and 6.

In the AF task (FIG. 5), a basic air-fuel ratio correction value BAF is calculated first at step 401 based on the air-fuel ratio (rich or lean) detected currently by the air-fuel ratio sensor 20 and the air-fuel ratio correction value AF calculate at the previous timing of AF calculation. Next, at step 402, the task A is called to retrieve or read out the air-fuel ratio learned value GAF to be used in the following step 403.

When the task A is called at step 402, the processing of FIG. 6 is executed. In this processing, at step 601, the air-fuel ratio learned value GAF is read out from the backup RAM 36, and then its reversed data is also read out. The learned value GAF and its reversed data are subjected to the exclusive-OR logic operation (EXOR) at step 602 to check normality/abnormality of the learned value GAF.

For instance, when he learned value is "1010", the reversed value is "0101". The exclusive-OR logic operation on those values results in "1111" as long as there exists no abnormality. If there exists any abnormality, the exclusive-OR logic operation results in "0" in some of the bits of the output of the exclusive-OR logic operation.

If the exclusive-OR logic operation result is "1111" (or "$FFFF" in the case of 2 byte data), that is, the check result at step 603 is YES (no abnormality in learned data), the processing returns to step 403 (FIG. 5). If the check result is NO (abnormality in learned data), an abnormality indicating flag NGF is set to "1" at step 604. Then, at step 605, an initial value is set as the air-fuel ratio learned value GAF at step 605, canceling the retrieved value. Here, the initial value may be set as a fail-safe value to a value which normally is when the control apparatus is produce anew. This initial value is set for use in the present air-fuel ratio correction value calculation (step 403) but not for storage in the backup RAM 36 in place of the previously stored learned value GAF.

Returning to step 403 (FIG. 5), the air-fuel ratio learned value GAF is added to the basic air-fuel ratio correction value BAF to determine the air-fuel ratio correction value AF at step 403. Thus, the AF task routine is completed.

As a result, the fuel injection duration TAU is calculated by using the air-fuel ratio learned value GAF which is free from abnormality, thus ensuring accurate engine control. Further, as only the learned data which is to be actually used is checked, the data checking processing can be completed in the shortest possible time and does not impede other control processing. In the similar manner, only the learned value related to the idle speed control may be checked in the task B in the ISC processing.

Figure 7:
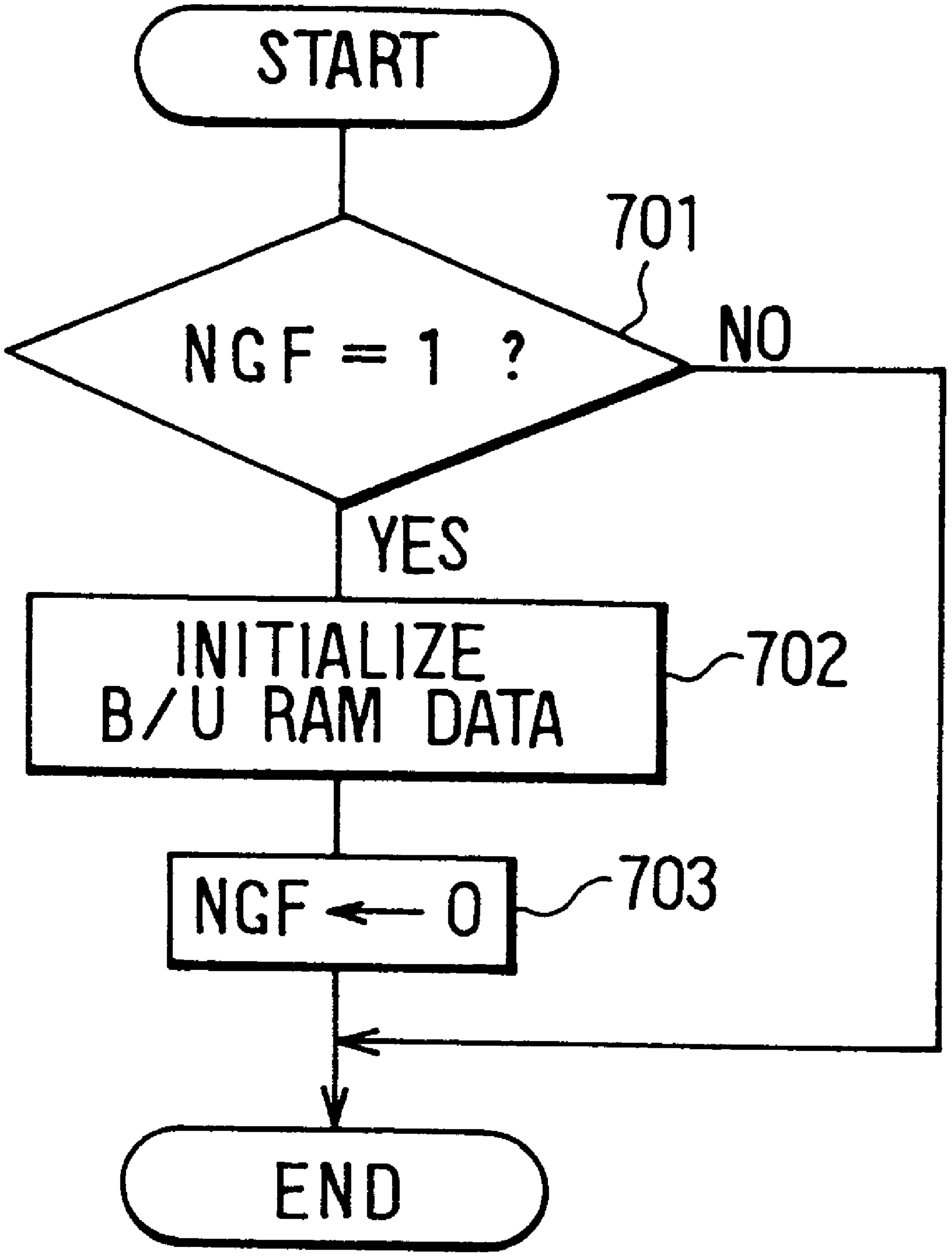
FIG. 7 is a flow diagram showing a processing of abnormality check task shown in FIG. 3.

The CPU 33 also executes the abnormality checking task as shown in FIG. 7. It is first checked at step 701 whether the abnormality flag NGF is set (NGF=1). Here, not only the abnormality flag NGF of task A is checked but also other abnormality flags of task B and of other memory checking tasks (not shown). If any one of the flags is "1" (YES), not only the data read out in the task A and task B and determined abnormal but also other data in any storage addresses of the backup RAM 36 are initialized at step 702. This initialization of all data is because it is likely that the other data are also abnormal or defective. Then the abnormality flag NGF is reset (NGF=0) at step 703.

In the above embodiment, the task A and task B only set the abnormality flag NGF, respectively, and the initialization of all data in the backup RAM 36 is executed in the abnormality checking task executed at the timing different from that of the task A and task B. According to this processing, the processing periods of the task A and task B can be maintained short even when the data in the backup RAM is found abnormal. It is to be noted that the data initialization processing periods of the tasks are necessarily lengthened and influence the other control programs, when the task A and task B are designed to execute the data initialization processing at the time of occurrence of abnormality.

In the event that the power supply system fails, data in not only some storage areas but also other storage areas are likely to be broken or become abnormal. Therefore, it is preferred to initialize all the data at once in one task than to initialize only the data found abnormal in each relevant task. Thus, once all the data are initialized, steps 604 and 605 will not have to be executed each time the backup RAM reading module is called.

The present invention should not be limited to the above disclosed embodiment, but may be implemented in many other modified ways without departing from the spirit of the invention.

What is claimed is:

1. A memory check apparatus for checking abnormality of data stored in a memory to be used in control value calculations for a vehicle, the apparatus comprising:

an execution order determination unit for determining an order of execution of a plurality of tasks which execute control value calculation programs;

an engine control module including the plurality of tasks; and a memory retrieval module including a processing of retrieving the data from the memory, the memory retrieval module being for checking abnormality of only the retrieved data before being used in the control value calculation programs and setting the retrieved data to an initialized value to be used in the control value calculation programs in place of the retrieved data.

2. A memory check apparatus for checking abnormality of data stored in a memory to be used in control value calculations for a vehicle, the apparatus comprising:

an execution order determination unit for determining an order of execution of a plurality of tasks which execute control value calculation programs;

an engine control module including the plurality of tasks;

a memory retrieval module including a processing of retrieving the data from the memory, the memory retrieval module being for checking abnormality of only the retrieved data before being used in the control value calculation programs and setting the retrieved data to an initialized value to be used in the control value calculation programs in place of the retrieved data; and a memory initialization module for executing an abnormality checking program at a timing different from execution of the processing for checking abnormality and for initializing all the stored data in the memory upon detection of abnormality in any one of the retrieved data.

3. A memory check method for checking abnormality of data stored in a memory to be used in control value calculations for a vehicle, the method comprising the steps of:

retrieving from the memory only data which is required to be used in the control value calculations;

checking abnormality of the retrieved data before using in the control value calculations;

setting the retrieved data to an initialized value to be used in the control value calculation programs in place of the retrieved data, when the retrieved data is found abnormal by the checking step; and maintaining all the data in the memory unchanged at the time of the setting step.

4. A memory check apparatus for checking abnormality of data stored in a memory to be used in control value calculations for a vehicle, the apparatus comprising:

an execution order determination unit for determining an order of execution of a plurality of tasks which execute control value calculation programs;

an engine control module including the plurality of tasks;

a backup RAM retrieval module including a processing of retrieving the data from the backup RAM;

a backup RAM initialization module including an abnormality checking processing for executing an abnormality checking program and for initializing all the stored data in the backup RAM upon detection of abnormality in any one of the retrieved data, wherein the execution order determination module is for determining execution timings of the plurality of tasks, initiating predetermined execution tasks in the engine control module at the determined timing, and initiating the abnormality checking processing at a timing different from the determined timings, the predetermined execution tasks are for executing the control value calculation program when called from the execution order determination unit and initiating the data retrieving processing of the backup RAM retrieval module, the data retrieving processing is for retrieving the data stored in the backup RAM, executing the abnormality checking program to check the retrieved data, and setting an abnormality information when the retrieved data is abnormal, and the abnormality checking processing is for checking the abnormality information, and initializing all the stored data in the backup RAM when abnormality is found in any one of the execution tasks.

5. A memory check method for checking abnormality of data stored in a memory to be used in control value calculations for a vehicle, the method comprising the steps of:

retrieving from the memory only data which is required to be used in the control value calculations;

checking abnormality of the retrieved data before using in the control value calculations;

setting abnormality information when the abnormality is found by the checking step;

checking the abnormality information at a specified timing different from a sequence of the retrieving step, the abnormality checking step and the setting step; and initializing all the stored data in the memory upon detection of the abnormality information in any one of the retrieved data.

6. A memory check method as in claim 5, further comprising the step of:

setting the retrieved data to an initialized value to be used in the control value calculation programs in place of the retrieved data, when the retrieved data is found abnormal by the checking step.

7. A memory check method for a vehicle having a control object and a computer including a memory storing therein various data to be used in calculating a control value for the control object, the method comprising the steps of:

retrieving a part of the various data from the memory when requested for calculating the control value;

checking only the retrieved part of data before being used in calculating the control value; and disabling a use of the retrieved part of data in calculating the control value when the retrieved part of the data is determined abnormal by the checking step.

8. A memory check method as in claim 7, further comprising the steps of:

setting the retrieved part of data to an initial value; and calculating the control value by using the initial value in place of the retrieved part of data.

9. A memory check method as in claim 7, further comprising the step of:

setting all the various data in the memory to an initial value at a predetermined time different from the checking step and the disabling step.

10. A memory check method as in claim 7, wherein:

the various data are variable type which are updated from time to time; and the control object is an engine of the vehicle.

* * * * *